US008612951B2

(12) United States Patent
Arnold

(10) Patent No.: US 8,612,951 B2
(45) Date of Patent: Dec. 17, 2013

(54) METHOD OF DETERMINING WHICH COMPUTER PROGRAM FUNCTIONS ARE CHANGED BY AN ARBITRARY SOURCE CODE MODIFICATION

(75) Inventor: Jeffrey Brian Arnold, Cambridge, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1030 days.

(21) Appl. No.: 12/427,724

(22) Filed: Apr. 21, 2009

(65) Prior Publication Data

US 2010/0269105 A1    Oct. 21, 2010

(51) Int. Cl.
*G06F 9/45*    (2006.01)

(52) U.S. Cl.
USPC .......................... 717/153; 717/140; 717/154

(58) Field of Classification Search
USPC ................... 717/140–144, 153–155
See application file for complete search history.

(56) References Cited

U.S. PATENT DOCUMENTS

| | | | | |
|---|---|---|---|---|
| 5,119,495 A * | 6/1992 | King | .............. | 717/153 |
| 5,215,794 A * | 6/1993 | Johnson | .............. | 428/35.8 |
| 5,504,901 A * | 4/1996 | Peterson | .............. | 717/144 |
| 5,848,274 A * | 12/1998 | Hamby et al. | .............. | 717/153 |
| 5,930,507 A * | 7/1999 | Nakahira et al. | .............. | 717/160 |
| 6,145,124 A * | 11/2000 | Price | .............. | 717/153 |
| 6,317,873 B1 * | 11/2001 | Townsend | .............. | 717/143 |
| 6,446,257 B1 * | 9/2002 | Pradhan et al. | .............. | 717/154 |
| 6,625,807 B1 * | 9/2003 | Chen | .............. | 717/154 |
| 6,625,808 B1 * | 9/2003 | Tarditi | .............. | 717/154 |
| 6,658,421 B1 * | 12/2003 | Seshadri | .............. | 717/140 |
| 6,687,899 B1 * | 2/2004 | Shann | .............. | 717/162 |
| 6,766,514 B1 * | 7/2004 | Moore | .............. | 717/159 |
| 6,901,584 B2 * | 5/2005 | Shann | .............. | 717/140 |
| 6,928,536 B2 | 8/2005 | Duesterwald | | |
| 7,299,462 B2 * | 11/2007 | Shann et al. | .............. | 717/153 |
| 7,412,697 B2 * | 8/2008 | Moore et al. | .............. | 717/144 |
| 7,549,147 B2 * | 6/2009 | Futoransky et al. | .............. | 717/155 |
| 7,620,943 B1 * | 11/2009 | Garthwaite | .............. | 717/140 |
| 7,752,609 B2 * | 7/2010 | Rioux | .............. | 717/141 |
| 7,779,394 B2 * | 8/2010 | Homing et al. | .............. | 717/136 |
| 7,814,467 B2 * | 10/2010 | Li et al. | .............. | 717/151 |
| 7,873,952 B2 * | 1/2011 | Shtilman et al. | .............. | 717/154 |
| 7,886,287 B1 | 2/2011 | Davda | | |
| 8,181,167 B2 * | 5/2012 | Zhao | .............. | 717/143 |
| 8,245,203 B2 * | 8/2012 | Becker | .............. | 717/140 |

(Continued)

OTHER PUBLICATIONS

Maoz et al, "A compiler for multimodel scenarios: Transforming LSCs into AspectJ", ACM Trans. on Software Eng. and Methodology, vol. 20, No. 4, article 18, pp. 1-41, 2011.*

(Continued)

*Primary Examiner* — Anil Khatri
(74) *Attorney, Agent, or Firm* — Osha Liang LLP

(57) ABSTRACT

A method of determining which computer program functions are changed by a source code modification to a computer program's source code. The method includes compiling the computer program's source code, using a compiler that generates a relocation entry for each program access to a program function or a program data item. The method further includes compiling source code resulting from modifying the computer program's source code with the source code modification, using a compiler that generates a relocation entry for each program access to a program function or a program data item The method further includes constructing a list of object code differences by comparing the compiled source code, and excluding from the list specified object code differences.

1 Claim, 2 Drawing Sheets

(56) References Cited

U.S. PATENT DOCUMENTS

| | | | |
|---|---|---|---|
| 8,245,209 B2* | 8/2012 | Gupta | 717/153 |
| 8,276,129 B1* | 9/2012 | Kiel et al. | 717/140 |
| 8,448,152 B2* | 5/2013 | Moore et al. | 717/144 |
| 2004/0054569 A1 | 3/2004 | Pombo et al. | |
| 2004/0107416 A1 | 6/2004 | Buban | |

OTHER PUBLICATIONS

Titzer et al, "Improving compiler runtime separation with XIR", ACM VEE, pp. 39-49, 2010.*

Kotha et al, "Automatic parallelization in a binary rewriter", IEEE, pp. 547-557, 2010.*

Sutter et al, "Link time binary rewriting techniques for program compaction", ACM Trans. on Prog. Lang. and Sys. vol. 27, No. 5, pp. 882-945, 2005.*

G. Altekar et al. "OPUS: Online Patches and Updates for Security", Proc. of the 14th USENIX Security Symposium, 2005, USENIX Assoc., Berkeley, CA, 16 pages.

A. Baumann et al., "Reboots are for Hardware: Challenges and Solutions to Updating an Operating System on the Fly", Jun. 2007, USENIX Assoc., 14 pages.

A. Baumann et al., "Providing Dynamic Update in an Operating System", Apr. 2005, Proc. of the USENIX Annual Technical Conference, USENIX Assoc., 13 pages.

B. Buck et al, "An API for Runtime Code Patching", J. of High-Performance Computing Applications, Jan. 2000, Sage Publications, Inc., 12 pages.

H. Chen et al., "Live Updating Operating Systems using Virtualization", Proc. of the 2nd ACM Conference on Virtual Execution Environments, Jun. 14-16, 2006, 10 pages.

K. Makris et al., "Dynamic and Adaptive Updates of Non-Quiescent Subsystems in Commodity Operating System Kernels", Proceedings of the 2nd ACM EuroSys. Conference, Mar. 21-23, 2007, 14 pages.

I. Neamtiu et al., "Practical Dynamic Software Updating for C", Proceedings of the 2006 ACM Conference on Programming Language Design and Implementation, Jun. 11-14, 2006, 12 pages.

A. Tamches et al., "Fine-Grained Dynamic Instrumentation of Commodity Operating System Kernels", Proceedings of the 3rd OSDI Symposium, Jan. 1999, 14 pages.

* cited by examiner

METHOD OF DETERMINING WHICH COMPUTER PROGRAM FUNCTIONS ARE CHANGED BY AN ARBITRARY SOURCE CODE MODIFICATION

BACKGROUND OF THE INVENTION

When software developers discover a problem in a computer program (such as an operating system kernel), they typically create a patch to fix the problem. A patch is an arbitrary source code modification to the computer program, and it can result in changes to many functions within the computer program. Automatically determining what computer program functions are changed by an arbitrary source code modification can be useful for many software processes, such as determining how to "hot update" a computer program (i.e., apply a source code modification to a running program without restarting the program).

Determining which computer program functions are changed by a source code modification is an important task that a hot update system must accomplish. Prior hot update systems determined which functions changed as a result of a source code modification at the source code layer, and thus were subject to a number of limitations (for example, they do not handle function inlining or implicit casting correctly).

BRIEF SUMMARY OF THE INVENTION

The present invention is an improved method for determining which functions within a computer program are changed as a result of a source code modification.

Determining which functions within a computer program are changed as a result of a source code modification can be challenging in many cases. Consider a source code modification that changes a data type in a function prototype in a C header file (e.g., from an "int" to a "long long"). Because of implicit casting, this patch implies changes to the executable code of any functions that call the prototyped function. Any method that attempts to determine which functions are changed by this patch by looking only at source code, not at object code, will encounter the problem that the callers of the prototyped function have not had their source code modified at all, even after C preprocessing.

The present invention can identify which functions are changed by an arbitrary source code modification, while avoiding detecting extraneous differences. The present invention does not require any information about programming language semantics, such as information about the semantics of implicit casting in C.

BRIEF DESCRIPTION OF THE DRAWINGS

The present invention will become more fully understood from the detailed description given below and the accompanying drawing, which are given by way of illustration only and thus are not limitative of the present invention, wherein.

DETAILED DESCRIPTION

Figure 1:
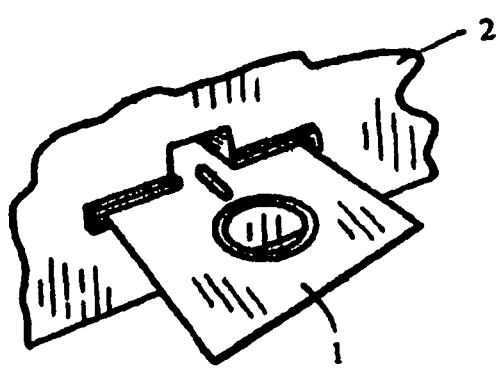
FIG. 1 illustrates a data storage medium having instructions stored therein for a computer to perform the method of the present invention.

As used herein, the term "computer program" or "program" refers to any computer program, including an operating system kernel.

The present invention determines which functions are changed by a source code patch while operating entirely at the object code layer—in other words, by looking at compiler output rather than the source-level contents of the patch.

The present invention must deal with the complication that compiler output can obscure the desired changes by introducing extraneous differences. Without taking any special measures, the object code corresponding to before and after the source code modification will contain many extraneous differences. These extraneous differences are not the result of semantic changes (i.e., changes that adjust the meaning of the code) introduced by the source code modification. For example, a number of extraneous differences result from location assumptions inherent in object code, e.g., the offsets provided to immediate jump instructions that are calculated relative to the program counter. The present invention makes it possible to generate a list of functions that are changed by an arbitrary source code modification, gaining the benefit of working at the object code layer while avoiding extraneous differences.

In order to avoid extraneous differences, the present invention employs compiler modifications and a specially-designed comparison process. Specifically, the compiler is modified to ensure that it generates relocations for all references to functions and data structures, which results in more general code that does not make assumptions about where other functions and data structures are located in memory. This compiler behavior can be accomplished using many different techniques, such as the "ffunction-sections" and "fdata-sections" configuration controls for the GNU C compiler.

As used below, the term "pre object code" refers to the output of compiling the computer program's original source code using the modified compiler. As used below, the term "post object code" refers to the output of compiling the computer program's modified source code using the modified compiler.

In order to determine which functions were changed by the source code patch, the present invention compares the object files by comparing corresponding object code sections between the pre object code and the post object code.

If a function has not changed, the non-relocation contents of the pre object code and the post object code will be identical, and all of the relocations will be equivalent. Two relocations are equivalent if they refer to program functions that have the same name, or refer to program data objects that have the same contents.

In order to determine which functions are changed by a source code patch to a computer program, the present invention performs the following process.

First, the present invention compiles the computer program's original source code, using a compiler modified or configured to generate, in compiler output, a relocation entry for each program access to a function or data item. The result of this compilation is the pre object code.

Second, the present invention compiles the computer program's source code, modified by applying the source code patch, using a compiler modified or configured to generate, in compiler output, a relocation entry for each program access to a function or data item. The result of this compilation is the post object code.

Using the results of the previous two steps, the present invention constructs a list of object code differences by comparing the pre object code with the post object code, excluding any object code differences where the pre object code and post object code both contain relocations that are equivalent.

The object code differences resulting from this process provide a list of the functions that have changed as a result of the source code modification.

Figure 2:
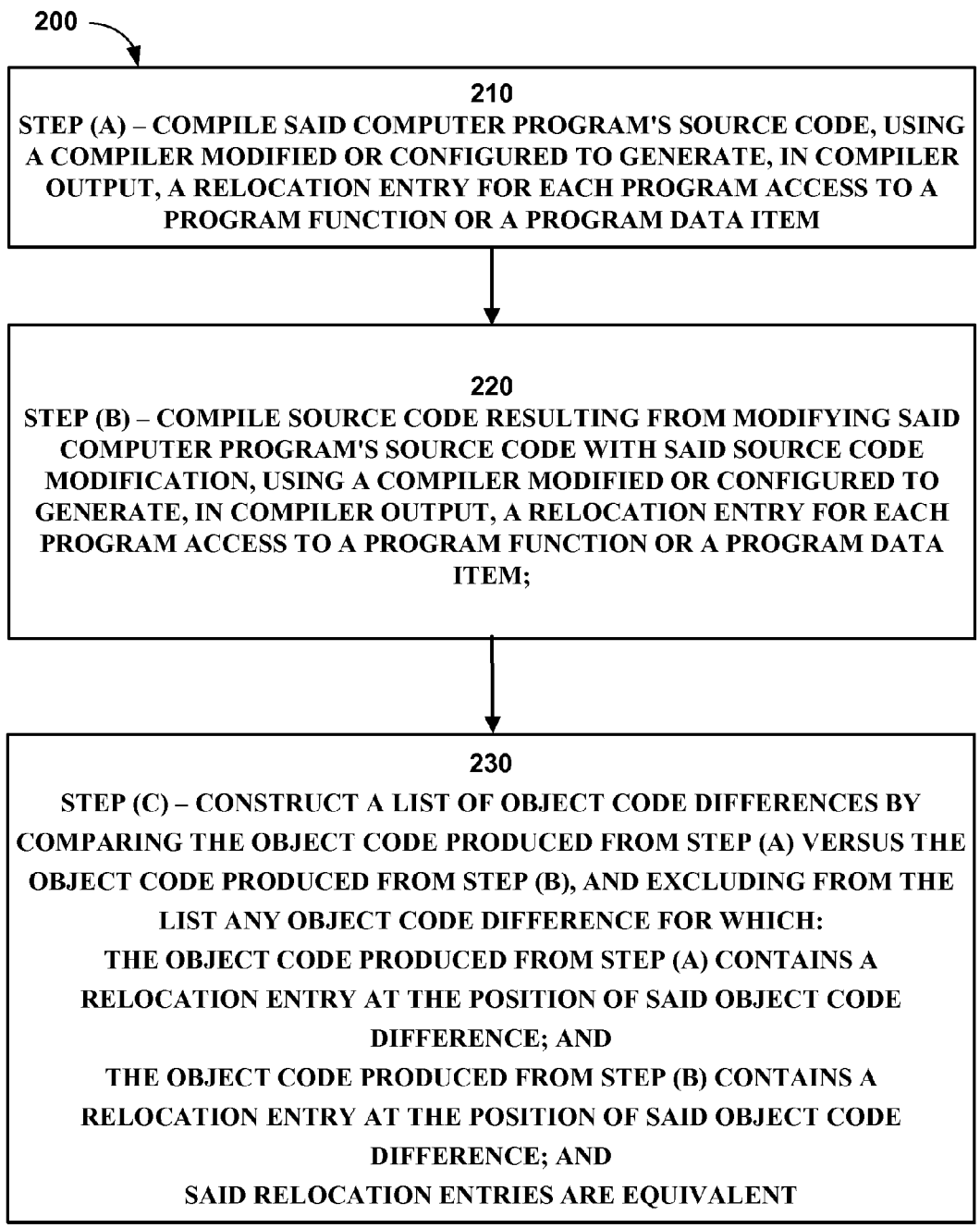
FIG. 2 is a flowchart of determining which computer program functions are changed by an arbitrary source code modification according to an aspect of the invention.

Thus, the improved method of the present invention can be summarized as follows:

FIG. 2 is a flowchart 200 of the steps of a method of determining what computer program functions are changed by a source code modification to a computer program's source code, the improvement of including the following steps in said method, with the order of steps (a) and (b) being interchangeable:

step (a) 210—compiling said computer program's source code, using a compiler modified or configured to generate, in compiler output, a relocation entry for each program access to a program function or a program data item; and step (b) 220—compiling source code resulting from modifying said computer program's source code with said source code modification, using a compiler modified or configured to generate, in compiler output, a relocation entry for each program access to a program function or a program data item; and step (c) 230—constructing a list of object code differences by comparing the object code produced from step (a) versus the object code produced from step (b), and excluding from the list any object code difference for which:

the object code produced from step (a) contains a relocation entry at the position of said object code difference; and the object code produced from step (b) contains a relocation entry at the position of said object code difference; and said relocation entries are equivalent.

FIG. 1 illustrates a data storage medium 1 having instructions stored therein for a computer 2 to perform the method of the present invention.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A computer program product having a non-transitory computer-readable medium including computer program logic encoded thereon that, when executed on a computer system provides a method of determining what computer program functions are changed by a source code modification, that causes the computer system to perform operations of:

compiling computer program source code to produce a first portion of object code using a compiler, wherein the first portion of object code comprises a first plurality of relocation entries;

compiling the computer program source code resulting from modifying the computer program source code with the source code modification to produce a second portion of object code using the compiler, wherein the second portion of object code comprises a second plurality of relocation entries, and wherein the first plurality of relocation entries and the second plurality of relocation entries correspond to program accesses to at least one of a program function and a program data item; and generating a list of object code differences by comparing the first portion of object code to the second portion of object code, and excluding from the list any object code difference for which:

the first portion of object code includes a first relocation entry of the first plurality of relocation entries at a position of the object code difference;

the second portion of object code includes a second relocation entry of the second plurality of relocation entries at the position of the object code difference; and the first relocation entry and the second relocation entry are equivalent.

* * * * *

UNITED STATES PATENT AND TRADEMARK OFFICE
CERTIFICATE OF CORRECTION

| | | |
|---|---|---|
| PATENT NO. | : 8,612,951 B2 | Page 1 of 1 |
| APPLICATION NO. | : 12/427724 | |
| DATED | : December 17, 2013 | |
| INVENTOR(S) | : Arnold | |

It is certified that error appears in the above-identified patent and that said Letters Patent is hereby corrected as shown below:

On Title page, column 2, Item (57) under abstract, line 11, delete "item" and insert -- item. --, therefor.

Signed and Sealed this
Fourteenth Day of October, 2014

Michelle K. Lee
*Deputy Director of the United States Patent and Trademark Office*